(12) United States Patent
Trinchillo

(10) Patent No.: US 11,905,016 B2
(45) Date of Patent: Feb. 20, 2024

(54) ADJUSTABLE ROLLER UNIT FOR MOVING A SLAT OF AN AIRCRAFT WING

(71) Applicant: LEONARDO S.P.A., Rome (IT)

(72) Inventor: Angelo Trinchillo, Mugnano di Napoli (IT)

(73) Assignee: LEONARDO S.P.A., Rome (IT)

(*) Notice: Subject to any disclaimer, the term of this patent is extended or adjusted under 35 U.S.C. 154(b) by 154 days.

(21) Appl. No.: 17/769,149

(22) PCT Filed: Oct. 19, 2020

(86) PCT No.: PCT/IB2020/059801
§ 371 (c)(1),
(2) Date: Apr. 14, 2022

(87) PCT Pub. No.: WO2021/079250
PCT Pub. Date: Apr. 29, 2021

(65) Prior Publication Data
US 2023/0339598 A1    Oct. 26, 2023

(30) Foreign Application Priority Data

Oct. 21, 2019   (IT) .................. 102019000019385

(51) Int. Cl.
*B64C 9/02* (2006.01)
*F16C 23/10* (2006.01)
*B64C 9/22* (2006.01)

(52) U.S. Cl.
CPC .............. *B64C 9/02* (2013.01); *B64C 9/22* (2013.01); *F16C 23/10* (2013.01); *F16C 2326/43* (2013.01)

(58) Field of Classification Search
CPC .... B64C 9/02; B64C 9/22; B64C 9/24; B64C 9/20; B64C 9/16; B64C 9/18; F16C 23/10; F16H 25/2247
See application file for complete search history.

(56) References Cited

U.S. PATENT DOCUMENTS 8,876,065 B2    11/2014   Grieco et al.
2011/0042525 A1  2/2011   Parker

FOREIGN PATENT DOCUMENTS

CN    109250068 A    1/2019
CN    208665529 U    3/2019
WO    2018005534 A1  1/2018

OTHER PUBLICATIONS

International Search Report, issued in PCT/IB2020/059801, dated Feb. 8, 2021, Rijswijk, NL.

*Primary Examiner* — Timothy D Collins
*Assistant Examiner* — Justin Michael Heston
(74) *Attorney, Agent, or Firm* — ArentFox Schiff LLP; Michael Fainberg

(57) ABSTRACT

A roller unit for moving a slat of an aircraft wing is provided. The roller unit is adjustable in height and axial position to adjust a gap between an idle roller and a guide rail integral with the slat. The idle roller is carried by an eccentric pin having a stem portion with a threaded portion and an axially grooved end portion. A threaded annular element cooperates with the threaded portion of the stem portion to define a desired axial position of the idle roller. An anti-rotation annular element, coupled in an axially slidable manner with the grooved end portion of the stem portion, may be coupled with the threaded annular element to prevent rotation thereof on the threaded portion of the stem portion. The threaded annular element and the anti-rotation annular element are tightened together between a pair of nuts.

5 Claims, 4 Drawing Sheets

ADJUSTABLE ROLLER UNIT FOR MOVING A SLAT OF AN AIRCRAFT WING

FIELD OF THE INVENTION

The present invention concerns an adjustable roller unit for moving a slat of an aircraft wing. More specifically, the present invention concerns a roller unit capable of adjusting the axial or roller position relative to a guide in which the roller is engaged in rolling.

BACKGROUND OF THE INVENTION

As known, "slats" (or extrados fins) are aerodynamic surfaces on the leading edge of fixed-wing aircraft wings which, once deployed, allow the wing to operate at a higher angle of incidence in order to reduce the stall speed. By opening the slats, the aircraft may fly at lower speeds, or take off and land at shorter distances. The slats are used during take-off and landing maneuvers, but are retracted in normal flight, in a closed position flush with the main body of the wing, to minimize aerodynamic drag.

The slats must be arranged on the main body of the wing without a gap when in the retracted normal flight position, so as not to disturb an airflow with respect to the wing. Therefore, it is necessary to mount the slats on the main body of the wing with high positioning accuracy.

To move the slats between the closed and open positions, a plurality of idle rollers are mounted on the fixed part of the wing, along which a curved guide or rail ("track") may slide, attached to a slat and moved by a drive mechanism. The fine adjustment of the position mentioned above is performed by adjusting the position of the slat in the retracted position relative to the guide. The position of the slat relative to the guide therefore determines the position of the slat relative to the main body of the wing.

For a better understanding of the state of the art and the inherent problems, a conventional type of roller device will first be described, illustrated in FIG. 5 of the accompanying drawings. A roller 14 is received with slight radial play between the opposite wings 15, 16, of a guide rail 10, having a double T (or H) cross section with a core 17. Each roller has a front face which must be kept correctly spaced from the core 17, maintaining an axial opening (or "gap") "G."

The position of the rotation axes of each roller must be adjusted so that the position of the slat is precisely adjusted relative to the airfoil. Therefore, each roller rolls on a stationary cylindrical and circular surface, which is eccentric relative to an axis of a supporting pin 24 mounted in a fixed position in a rib 11. By adjusting the angular position of the eccentric axis of rotation of the roller relative to the fixed axis of the pin, the height of the guide is adjusted and thus the vertical position of the slat relative to the airfoil.

For axial adjustment of the gap G, the following steps are carried out:
a) installing the rollers on the ribs of the leading edge of the wing;
b) mounting the slat on the rollers;
c) measuring the axial gap between the front face of the roller and the core 17 of the guide rail 10;
d) removing the guide rail with the slat from the rollers;
e) removing the rollers to add, remove or replace an annular element (or "shim") 18 of axial thickness suitable to obtain the axial gap required in the drawing which ensures non-interference between the roller and the core; and
f) reinstalling the guide rail with the slat on the rollers.

The above-described conventional adjustment system is slow and disadvantageous from a practical point of view, because it requires the removal of the slat and the rollers to allow for adjustment thereof. The aforesaid operations are also complicated by the fact that the space between the two rollers of each pair of facing rollers (with the guide rail interposed in the middle) is rather narrow, which makes it difficult to extract and remount the rollers on the two adjacent ribs.

SUMMARY OF THE INVENTION

The present invention has the object of providing a system for adjusting the rollers of the type specified above, mainly addressing the problem of optimizing the longitudinal adjustment of the roller relative to the guide rail. It is also desired to improve locking of the roller not only in the appropriate longitudinal or axial position, but also in the radial or vertical position.

The aforesaid and other objects and advantages are achieved according to the present invention by an adjustable roller unit and an aircraft wing as described and claimed herein. Advantageous embodiments of the present invention are also described.

BRIEF DESCRIPTION OF THE DRAWINGS

The functional and structural features of a few preferred embodiments of a roller unit according to the present invention will now be described. Reference is made to the accompanying drawings, wherein.

DETAILED DESCRIPTION

Figure 1:
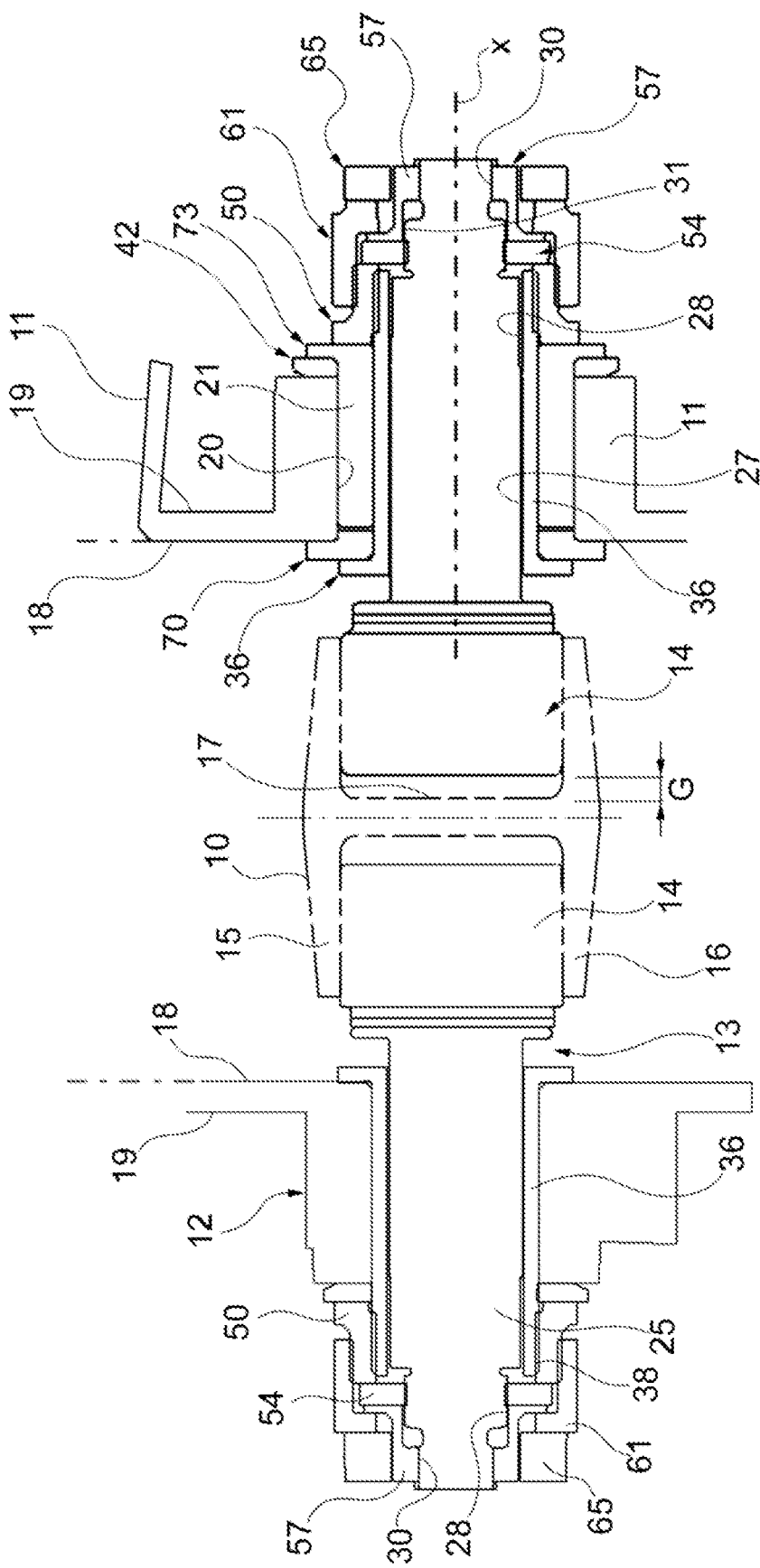
FIG. 1 is a schematic vertical view in cross section of a guide rail engaged in rolling by a pair of roller units carried by a respective pair of facing ribs in a wing of an aircraft.
Figure 2:
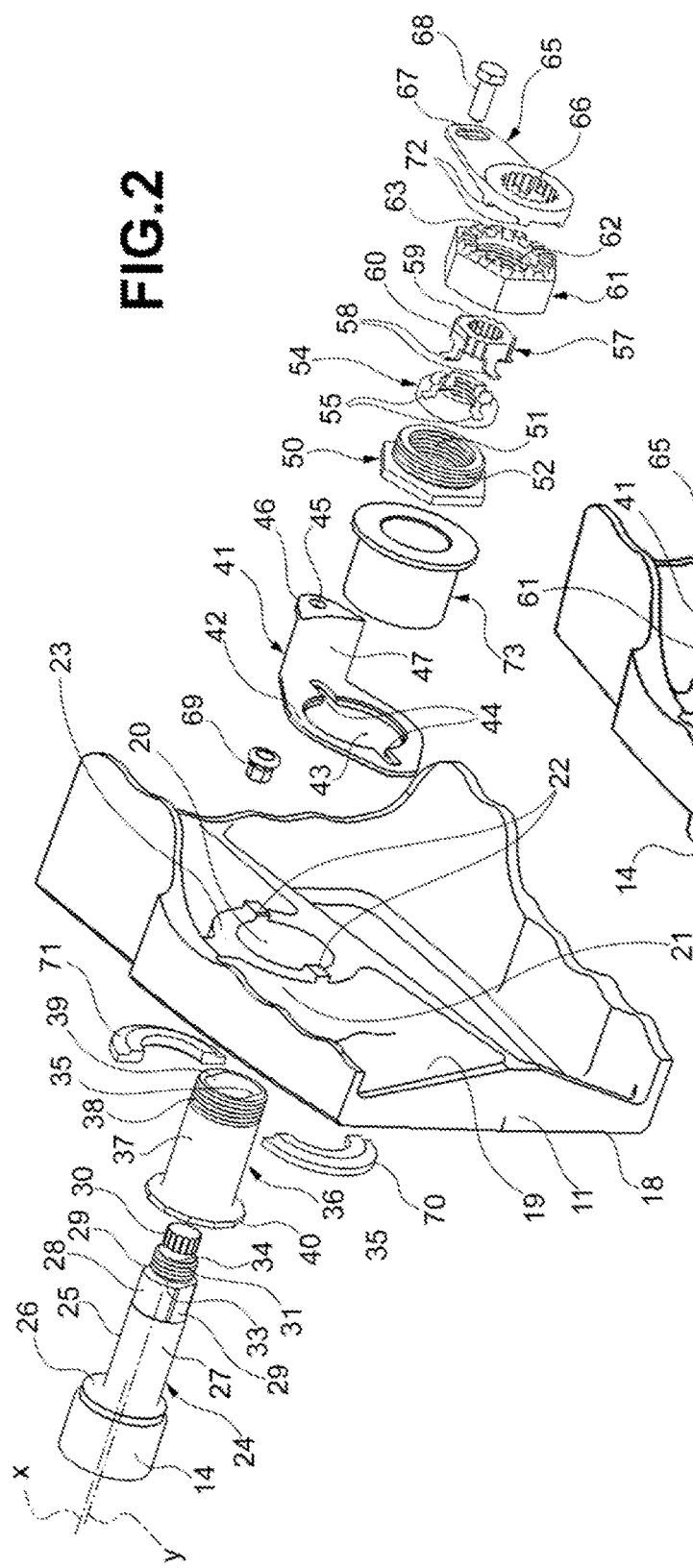
FIG. 2 is an exploded perspective view of a roller unit with part of a rib.
Figure 3:
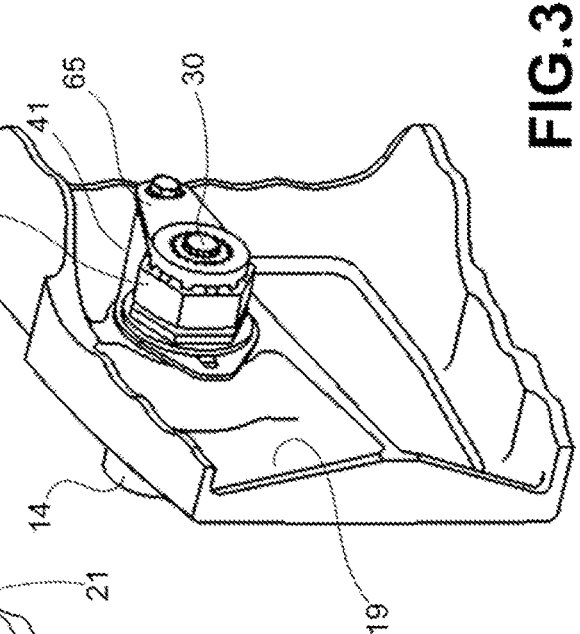
FIG. 3 is a perspective view of the components of FIG. 2 in assembled condition.
Figure 4:
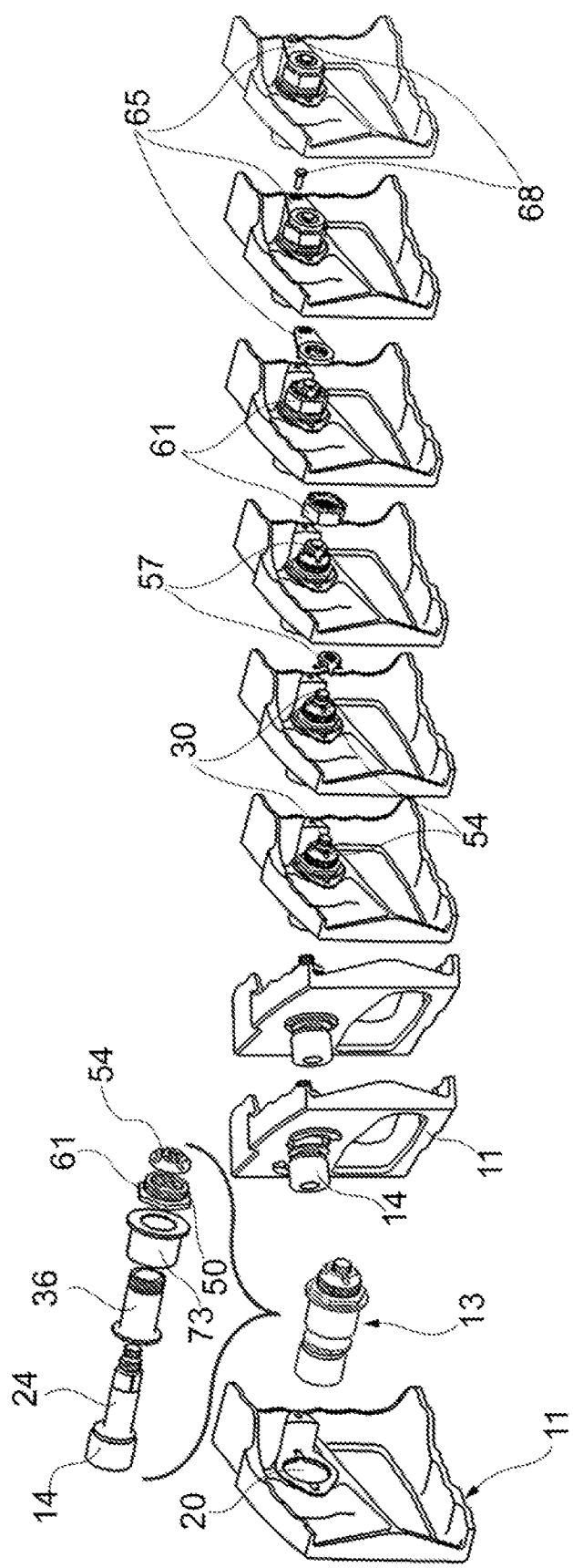
FIG. 4 schematically shows a series of perspective views for the assembly of the roller unit on the rib of an aircraft wing.
Figure 5:
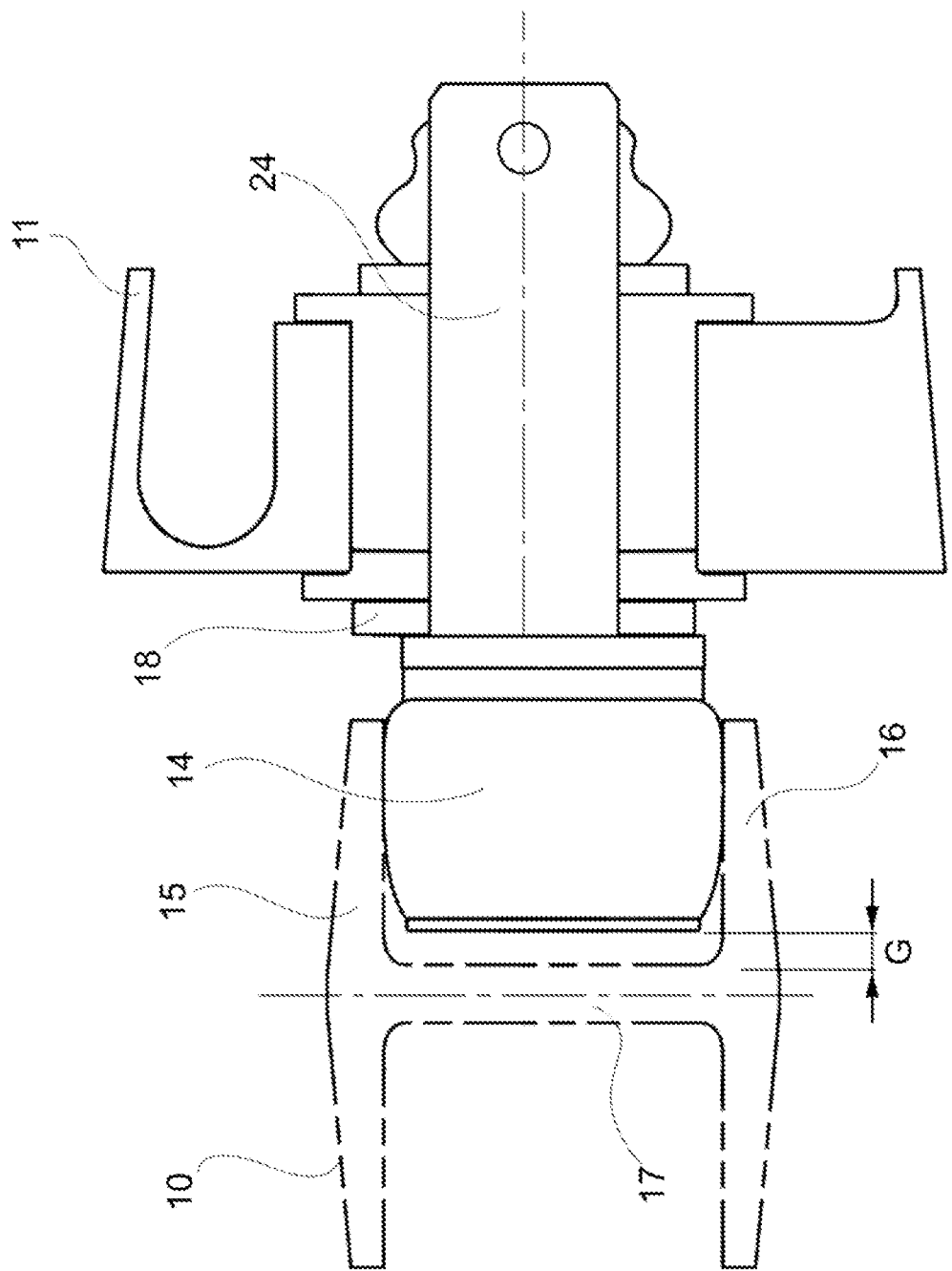
FIG. 5 is a schematic view in vertical cross section of a guide rail and a rib with a roller unit of a known type.

Referring initially to FIG. 1, reference number 10 designates a guide rail, integral with a slat (not shown) of the leading edge of the wing of an aircraft. The guide rail 10 is interposed and equidistant between two ribs 11, 12 of the wing.

Each rib carries at least two roller units 13, spaced on each rib in the direction here defined as transverse, perpendicular to the plane of representation of the drawing of FIG. 1. Each roller unit 13 comprises an idle roller 14 rotatable about a respective horizontal or substantially horizontal axis of rotation x. The roller units carried by two adjacent ribs are arranged in pairs, on the opposite right and left sides of the guide rail 10. The axes of rotation of each pair of rollers are aligned substantially in a horizontal direction defined here axial or longitudinal. Throughout the present description and claims, the terms and expressions indicating positions and orientations such as "axial," "longitudinal," "radial" and "transverse" are understood to refer to the direction generally indicated by the axis of rotation of a roller.

The guide rail 10 does not differ from a traditional guide rail, firmly fixed to a slat which has the task of translating, by effect of a command given by an actuator (not shown), between two opposite positions:
- a first closed slat position, flush with the airfoil, for a normal flight configuration, and
- a second open or deployed slat position, translated and rotated relative to the first closed position, so as to form a predetermined angle with the surface of the airfoil.

Typically, the guide rail has a curved profile, contoured according to the wing profile, and has a so-called "double T" (or "H") cross section, with two opposite wings 15, 16, and a core 17. Each roller 14 is engaged by rolling between the wings 15, 16, to the right or left of the core 17. Both the vertical position of each roller in relation to the wings 15, 16 and the longitudinal or axial position of the roller in relation to the core 17 must be adjusted so that a predetermined axial gap "G" is maintained.

The ribs 11, 12, which extend in parallel vertical planes and are spaced orthogonally to the wingspan, are made of rigid material (for example metal or composite material) and have a contoured shape known per se in its entirety, preferably machined. Each rib defines two opposite vertical sides: a first side 18 defined here as inner, facing the guide rail 10, and a second opposite or outer side 19.

To mount each roller unit 13, each rib has a respective circular cylindrical through seat 20 which extends horizontally and axially between the two opposite sides 18, 19 of the rib. In the illustrated embodiment, the through seat 20 is formed of a cylindrical tubular formation 21 which opens on the second side 19 of the rib where at least one anti-rotation element 22 is formed in relief or in recess. In the illustrated example, two anti-rotation elements are provided spaced about the through seat 20, in the form of projections or teeth 22 axially projecting from a circular edge 23 that the tubular formation 21 has on the second side 19 of the rib. The anti-rotation elements 22 cooperate to maintain the angular position which is imparted to an eccentric pin 24 on which the roller 14 is rotatably mounted.

In each roller unit 13, the idle roller 14 is mounted on a pin 24, which has a stem portion 25 defining a horizontal axis y and a cylindrical portion 26 at a first end of the pin 24. The cylindrical portion 26 is the part which rotatably supports the idle roller 14, and is eccentric relative to the stem portion 25. In effect, the cylindrical portion 26 defines the axis of rotation x of the roller, which is eccentric, parallel and spaced apart relative to the axis y of the stem portion 25.

The stem portion 25 has a cylindrical portion 27, a portion 28 with a non-circular cross section, in this example with two opposite flat surfaces 29, an end 30 with axial grooves and a cylindrical portion 31 with outer threading between the non-circular portion 28 and the grooved end 30. Two radial shoulders 33, 34 are formed respectively between the non-circular portion 28 and the threaded cylindrical portion 31 of the stem portion 25, and between the threaded cylindrical portion 31 and the grooved end 30.

Each roller unit 13 comprises a flanged bushing 36, having an outer cylindrical surface 37 with a threaded end portion 38 and an axially extending inner cavity with a cylindrical portion (not shown) adapted to receive the cylindrical portion 27 of the stem portion 25, and a cavity portion with a non-circular section 39 having a cross section corresponding to the cross section of the non-circular portion 28 of the stem portion 25, in this example with two facing flat surfaces 35. The flanged bushing 36 also has a flange 40, preferably with a polygonal profile.

The roller unit 13 also comprises a locking bracket 41 adapted to cooperate with the anti-rotation elements 22 of the rib to maintain the angular position of the pin 24, once adjusted and locked, and therefore the vertical position of the axis of rotation x of the idle roller 14.

The locking bracket 41 has a perforated plate 42 with an opening 43, circular in this example, and one or more anti-rotation elements 44 corresponding and cooperating with the anti-rotation elements 22 of the rib. In the illustrated example, the anti-rotation elements 44 of the locking bracket 41 comprise two recesses which connect to the circular opening 43 and may receive the teeth 22 protruding from the second side 19 of the rib. The circular opening 43 has a radial or transverse dimension greater than or equal to the diameter of the through seat 20 of the rib and is configured to rest against the circular edge 23 of the tubular formation 21.

In the locking bracket 41 a hole 45 is also formed, eccentric and axially offset from the perforated plate 42. The hole 45 is made in a flat tab 46 axially offset from the perforated plate 42 and connected thereto by a lateral shank 47 extending axially.

A nut 50 has an inner cylindrical threaded cavity 51 and an outer cylindrical threaded surface 52. The inner cylindrical threaded cavity 51 corresponds to the threading of the outer threaded end portion 38 of the flanged bushing 36.

A threaded annular element 54 has an inner cylindrical cavity 55 with a threading corresponding to the threading of the cylindrical portion 31 with outer threadings of the stem portion 25 of the pin 24. The threaded annular element 54 forms at least one seat or other outer engagement means 55, in this example four angularly spaced recesses 55.

An anti-rotation annular element 57 has at least one engagement means 58 adapted to cooperate with the outer engagement means 55 of the threaded annular element 54. In the illustrated example, the engagement means 58 is made in the form of four angularly spaced feet, configured to engage in the respective recesses 55 of the threaded annular element 54.

The anti-rotation annular element 57 is penetrated by a cylindrical grooved cavity 59, with diameter and grooves corresponding to the diameter and grooves of the grooved end 30 of the stem portion 25 of the pin 24. The anti-rotation annular element 57 also has radially outer axial grooves 60.

A locking end nut 61 has a threaded inner cylindrical cavity 62, with a diameter and threading corresponding to the outer cylindrical threaded surface 52 of the nut 50, and a face provided with axial projections and recesses 63.

A locking lever 65 forms a grooved or notched circular opening 66 corresponding to the grooved outer profile of the anti-rotation annular element 57. The locking lever 65 forms projections 72 adapted to engage with the axial projections and recesses 63 of the locking end nut 61. A through hole 67 is formed in the locking lever 65, transversely offset from the notched opening 66 and preferably elongated in a tangential direction, to receive a fixing screw 68 to be screwed into the hole 45 of the locking bracket 41. A nut 69 may be used to lock the fixing screw 68 once it is threaded through the through hole 67 and the hole 45.

To adjust the vertical position of the axis of rotation of a roller, and the axial or longitudinal position of the roller relative to the slat guide, the following operations are carried out.

The roller units are preliminarily partially assembled and mounted on the ribs, then the guide rail is inserted on the rollers; after that an adjustment of the vertical position of the axes of rotation of the rollers is carried out, and finally the assembly of each roller unit is completed with adjustment of the axial position of the rollers and of the axial gap of each roller relative to the guide rail.

A roller unit 13 is pre-assembled by first mounting a roller 14 on a pin 24. The locking bracket 41 is applied on the outer side of the rib coupling the anti-rotation means 22 and 44. The stem portion 25 of the pin 24 is inserted into a flanged bushing 36. As a result of the shape coupling of the flat surfaces 29, 35 on the stem portion 25 and in the cavity 39, the pin 24 remains angularly integral with the flanged bushing 36.

For the rib 12 shown on the left in FIG. 1, the assembly composed of the pin 24 and flanged bushing 36 is inserted into the through seat 20 from the side 18 of the rib 12 facing the guide. Once the roller unit has been inserted into the left rib, there will generally not be sufficient space to insert a roller unit into the right rib 11 from the side of the guide; therefore the roller unit must be inserted through the through seat 20 of the right rib from the outer side (from the right in FIG. 1). For this reason, the diameter of the through seat 20 in the right rib is greater than the diameter of the through seat 20 of the left rib. To apply a roller unit with a roller having a diameter identical to that of the roller mounted on the left rib also to the right rib, adapter elements may be applied on the outer and inner sides of the right rib (having the through seat 20 of greater diameter): a pair of semicircular shims 70, 71, adapted to remain interposed between the flange 40 of the flanged bushing 36 and the inner side 18 of the rib 11, and a flanged bushing 73 from the outer side 19 of the same right rib 11.

For the right rib 11, the bushing 73 is inserted into the through seat 20 from the outer side 19 of the rib, so as to remain interposed between the flanged bushing 36 and the through seat and eliminate the radial play between the roller unit and the rib.

The same operations described above are repeated to partially pre-assemble all the roller units on the two facing ribs, and then the guide rail 10 is inserted rolling it on the rollers.

The vertical position of the axis of rotation of each roller 14, is then adjusted by rotating the eccentric pin 24 in the through seat 20 of the rib, the position of which is fixed. The rotation of the pin 24 may be performed manually or by means of a wrench, acting on the polygonal contour of the flange 40, which is rotationally integral with the pin 24. The nut 50 is screwed onto the threaded portion 38 of the flanged bushing 36, thus tightening the flanged bushing 36 against the inner side 18 of the rib, and the locking bracket 41 (and the bushing 73 for the right 11) against the outer side. The angular position of the pin 24 and thus the height of the axis of rotation of the roller 14 relative to the wings 15, 16 of the guide rail 10 are thus adjusted.

In this partially mounted condition, in each roller unit, the assembly composed of the roller 14 and the eccentric pin 24 may still move axially relative to the flanged bushing 36 and the respective rib and the other elements (41, 70, 71, 73) already rotationally locked on the rib.

To adjust the axial position of the roller, and thus the axial gap G between the roller 14 and the core 17 of the guide, the assembly consisting of the roller 14 and the eccentric pin 24 relative to the rib is manually slid in the axial direction (in the fwd-aft direction), until the axial position of the roller which corresponds to a prescribed axial gap G between the roller 14 and the core 17 of the guide is found. Once the desired axial position has been found, the threaded annular element 54 is screwed onto the threaded cylindrical portion 31 of the stem portion 25 of the pin 24, until the threaded annular element 54 is brought into axial abutment against the nut 50.

It is therefore necessary to lock the position of the threaded annular element 54 on the pin 24 to maintain the axial position of the pin 24 and of the roller 14 relative to the rib 11 and the guide rail 10. To do this, the anti-rotation annular element 57 is pushed along the grooved end 30 of the pin 24, causing the anti-rotation means (e.g. feet) 58 to be coupled with the corresponding anti-rotation means 55 (e.g. recesses) of the threaded annular element 54. In this way, the threaded annular element 54 is prevented from rotating further on the pin 24, and therefore screwing or unscrewing from the given position. The abutment of the threaded annular element 54 against the nut 50 determines the axially most advanced position (or minimum axial gap G) between the roller 14 and the core 17 of the guide rail 10.

To prevent the roller 14 from moving away from the core 17, increasing the axial gap G, the threaded annular element 54 must be locked axially from the outer side. For this purpose, the locking end nut 61 is screwed onto the threaded outer cylindrical surface 52 of the nut 50, axially tightening the anti-rotation element annular 57 against the threaded annular element 54. Finally, to prevent the locking end nut 61 from coming unscrewed, the locking lever 65 is applied on the end of the grooved end 30 of the pin 24 engaging the locking end nut 61 with locked rotation due to the coupling of the axial recesses 63 thereof with the axial projections 72 of the lever 65. The fixing screw 68, inserted through the opening 67 of the lever 65, and the hole 45 aligned in the locking bracket 41, fixes the axial position of the roller 14.

As may be appreciated, to adjust the axial gap of a roller relative to the guide rail, one need only adjust the position of the threaded annular element 54. It is no longer necessary to remove the guide rail with a slat from the rollers, and thus the rollers from the rib, and reinstall everything after adjustment, as is done traditionally.

Various aspects and embodiments of the present invention have been described; it is understood that each embodiment may be combined with any other embodiment. Moreover, the embodiments and the details of construction may be widely varied with respect to that which has been described and illustrated purely by way of non-limiting example, without thereby departing from the scope of protection as described and claimed herein.

The invention claimed is:

1. A roller unit for moving a slat of an aircraft wing, the slat being fixed to a plurality of guide rails, each guide rail sliding on facing pairs of roller units carried by facing pairs of ribs between a closed slat position and a deployed slat position, wherein each roller unit comprises:
   a roller supporting pin having a stem portion capable of being fixed in an adjustable manner to one rib of the aircraft wing and defining a first axis (y);
   a roller mounted idle on the roller supporting pin and rotatable around a second axis (x) that is eccentric with respect to the first axis (y);
   a first threaded nut for locking the stem portion of the roller supporting pin in a selected angular position to place the second axis (x) of the roller at a selected relative height with respect to the first axis (y);
   adjusting means for adjusting an axial position of the roller supporting pin with respect to said rib and an axial gap between the roller and an associated guide rail of the slat;
   wherein said adjusting means for adjusting the axial position of the roller supporting pin comprise:
   a threaded length of the stem portion of the roller supporting pin and a threaded annular element cooperating with the threaded length to define therewith a desired axial position of the roller, the threaded annular element axially abutting against the first threaded nut in said desired axial position of the roller;

an axially splined end length of the stem portion of the roller supporting pin and an anti-rotation annular element axially slidingly coupled with the axially splined end length of the stem portion, the anti-rotation annular element engaging the threaded annular element to prevent rotation of the threaded annular element on the threaded length of the stem portion; and a second threaded locking nut for axially tightening the anti-rotation annular element against the threaded annular element and providing an axial abutment for the threaded annular element and the anti-rotation annular element on an axial side opposite to the first threaded nut.

2. The roller unit of claim 1, wherein the first threaded nut comprises an outer cylindrical threaded surface on which a threaded inner cylindrical surface of the second threaded locking nut is threadedly coupled to axially tighten the anti-rotation annular element against the threaded annular element.

3. The roller unit of claim 1, wherein each roller unit further comprises a flanged bushing comprising an outer cylindrical surface with a threaded end portion and an axially extending inner cavity partially accommodating a cylindrical portion of the stem portion of the roller supporting pin, and the first threaded nut comprises an inner cylindrical threaded cavity that can be coupled to the threaded end portion of the outer cylindrical surface of the flanged bushing, so as to tighten the flanged bushing in a through-seat of one rib and lock the flanged bushing with respect to the rib.

4. The roller unit of claim 3, wherein the axially extending inner cavity of the flanged bushing provides a cavity portion having a non-circular cross-section, the stem portion of the roller supporting pin comprises a non-circular portion having a cross-section corresponding to the non-circular cavity portion of the flanged bushing, and the non-circular portion of the stem portion is received in the non-circular cavity portion of the flanged bushing, whereby the roller supporting pin is rotationally locked with respect to the flanged bushing but axially adjustable with respect thereto.

5. An aircraft wing, comprising:

at least one slat, a plurality of ribs extending in parallel vertical planes and spaced perpendicularly along a wingspan, a plurality of roller units according to claim 1, the roller units facing one another in pairs and being mounted on pairs of facing ribs, each roller unit being accommodated in a respective cylindrical circular seat extending horizontally and axially between two opposite sides of a rib, and a plurality of guide rails fixed to each slat, the guide rails being parallel and spaced from one another and each interposed in a central position between a pair of facing ribs, the guide rails rollably engaging a plurality of idle rollers each provided by a respective one of the roller units.

* * * * *